US006535935B1

(12) United States Patent
Carlson et al.

(10) Patent No.: US 6,535,935 B1
(45) Date of Patent: Mar. 18, 2003

(54) METHOD OF SENDING DATA STREAMS USING A REFETCHABLE FIRST-IN-FIRST-OUT MEMORY WHICH IS READ IN A SEQUENCE THAT BACKS-UP

(75) Inventors: Lewis Rossland Carlson, Salt Lake City, UT (US); John James Carver, II, Salt Lake City, UT (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/544,712

(22) Filed: Apr. 6, 2000

(51) Int. Cl.⁷ ............................................... G06F 13/00
(52) U.S. Cl. ................................ 710/58; 710/4; 710/7; 710/20; 710/21; 710/32; 710/35; 710/52; 710/58; 710/53; 710/56; 710/65; 710/310
(58) Field of Search ........................... 710/4, 7, 20, 21, 710/32, 35, 52, 53, 56, 65, 310, 58

(56) References Cited

U.S. PATENT DOCUMENTS

| 5,917,503 A | * | 6/1999 | Zakharia et al. | ............ 345/506 |
| 6,108,723 A | * | 8/2000 | Simms et al. | .................. 710/35 |
| 6,243,768 B1 | * | 6/2001 | Khandekar | .................... 710/35 |

* cited by examiner

*Primary Examiner*—Jeffrey Gaffin
*Assistant Examiner*—Mohammad O. Farooq
(74) *Attorney, Agent, or Firm*—Charles J. Fassbender; Mark T. Starr; Lise A. Rode (57) ABSTRACT

A stream of data words is sent from a memory thru a controller and an external data buffer to an I/O device by a method which includes the steps of: 1) transferring a segment of the stream of data from the memory into the controller while concurrently sending a subsegment of the segment from the controller thru the data buffer to the I/O device via a transmission burst in which the receipt of individual parts of the subsegment are not acknowledged by the I/O device; 2) receiving a signal in the controller from the I/O device at any time during the sending step, to terminate the transmission burst; 3) subsequently receiving a signal in the controller, from the I/O device, to restart the transmission burst beginning with a selectable part of the last subsegment that was sent; 4) removing from the controller, only the portion of the segment which precedes the selectable part of the subsegment; and, 5) repeating the above steps until the stream of data is received in its entirety by the I/O device. To perform the above steps, the controller includes a refetchable First-In-First-Out memory (RFIFO) into which the segments are written in a cyclic sequence and from which the subsegments are read in the same sequence except that read sequence backs up.

11 Claims, 7 Drawing Sheets

METHOD OF SENDING DATA STREAMS USING A REFETCHABLE FIRST-IN-FIRST-OUT MEMORY WHICH IS READ IN A SEQUENCE THAT BACKS-UP

BACKGROUND OF THE INVENTION

The present invention relates to methods of sending multiple streams of data from a memory thru a controller to respective I/O devices, where a) the controller is coupled to the I/O devices thru at least one external data buffer (such as a data buffer in a bridge), and b) each stream of data is sent via a transmission burst in which the receipt of individual data words are not acknowledged.

One particular use for the present invention is to aid in the execution of multiple WRITE-TO-DISK instructions. With each WRITE-TO-DISK instruction, a stream of data is read from a memory by a controller; and concurrently, the controller sends the data to the particular disk on which the data is to be written. Typically, the stream of data is in the form of a data chain which consists of several data blocks that have separate starting addresses in the memory and are linked together by a list of pointers.

In the simplest case, the controller is coupled by a single I/O bus directly to a bus adapter for a set of disks. However, only a limited number of bus adapters, with their respective disks, can be attached to a single I/O bus. Thus, one or more bridges are often coupled between the controller and the bus adapters, in order to increase the total number of disks above the limit for the single bus.

Usually a bridge includes a data buffer which temporarily holds a portion of the data stream that is sent thru the bridge. But due to that data buffer, a problem arises when the data stream is sent thru the bridge via a transmission burst to a bus adapter which is of a type that can stop the transmission burst at any time by sending a terminate signal.

When such a terminate signal is sent, a portion of the data stream will be in the data buffer of the bridge, where it will be discarded. Thus the controller is unable to determine how much data was actually received by the bus adapter; and consequently, the controller is unable to restart the execution of the WRITE-TO-DISK instruction at the point where the terminate signal occurred.

One method for dealing with the above terminate problem is to send the data stream from the controller thru the bridge to the bus adapter such that a separate acknowledgment signal is sent by the bus adapter for each word of data that it receives. However, when the data is sent by that method, the transmission rate is greatly reduced in comparison to the burst mode of transmission wherein separate acknowledgment signals for each received data word do not occur.

Another method for dealing with the above terminate problem is to receive from the bus adapter, at some time after the terminate signal, the address in the memory of the last word which the bus adapter actually received. Then, the controller can restart the execution of the WRITE-TO-DISK instruction by re-reading the data stream from the memory starting at the received address; and by concurrently sending the data which it reads to the bus adapter.

However, the above method is also slow because it requires portions of the data stream to be re-read by the controller from the memory before the transmission burst to the bus adapter can be re-started. Further, the above method does not even work in the case where the data stream is in the form of a data chain because the controller cannot detect when the data in the stream that it receives during a transmission burst, changes from one data block in the memory to another data block.

Accordingly, a primary object of the present invention is to provide a method of sending streams of data from a memory thru a controller and an external data buffer to I/O devices, via a transmission bursts, in which the above problems are overcome.

BRIEF SUMMARY OF THE INVENTION

In accordance with the present invention, a stream of data words is sent from a memory thru a controller and an external data buffer to an I/O device by a method which includes the following five steps:

1) transferring a segment of the stream of data from the memory into the controller while concurrently sending a subsegment of the segment from the controller thru the data buffer to the I/O device via a transmission burst in which the receipt of individual parts of the subsegment are not acknowledged by the I/O device;

2) receiving a signal in the controller, from the I/O device at any time during the sending step, to terminate the transmission burst;

3) subsequently receiving a signal in the controller, from the I/O device, to restart the transmission burst beginning with a selectable part of the last subsegment that was sent;

4) removing from the controller, only the portion of the segment which precedes the selectable part of the subsegment; and, 5) repeating the above steps until the stream of data is received in its entirety by the I/O device.

With the above method, each part of the entire data stream is read from the memory and transferred into the controller only one time. This occurs due to the step in the above paragraph 4). By comparison, selectable parts of the data stream subsegments are sent twice from the controller thru the external data buffer to the I/O device. This occurs due to the step in the above paragraph 3).

To perform the above method, the controller preferably includes a novel refetchable first-in-first-out memory (RFIFO). In operation, the controller writes each segment of the data stream into the RFIFO in a first cyclic sequence, and the controller reads each subsegment from the RFIFO in a second sequence. This second sequence is the same as the first sequence except that the second sequence backs-up in response to the signal to restart the transmission burst beginning with a selectable part of the subsegment. Such reading of the RFIFO in the second sequence, which backs-up, cannot be accomplished by a conventional first-in-first-out memory because a conventional first-in-first-out memory can only be read in a single fixed cycle.

DETAILED DESCRIPTION

Figure 1:
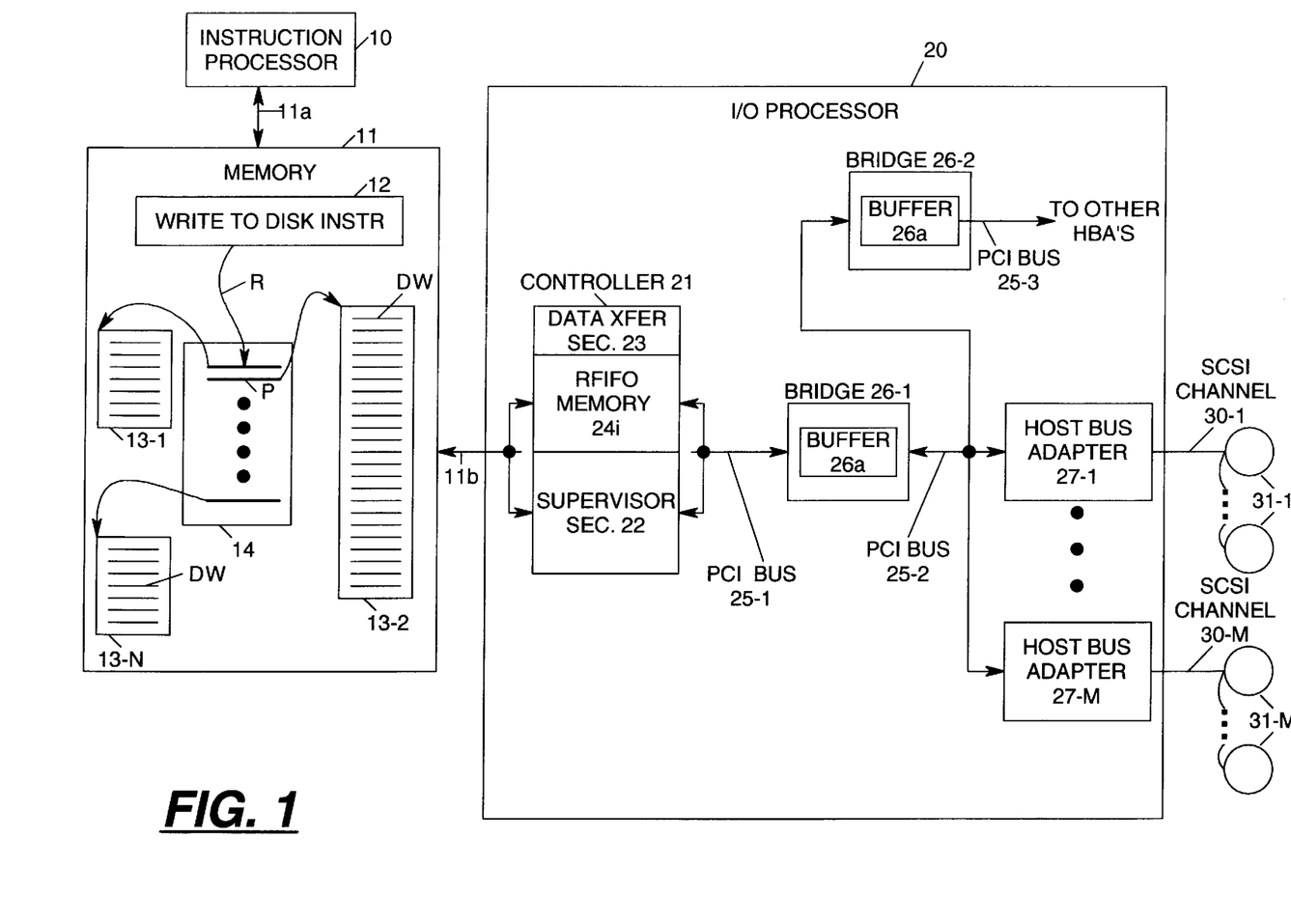
FIG. 1 shows one preferred embodiment of the data processing system which concurrently sends multiple streams of data to respective I/O devices, in accordance with the present invention.

With reference now to FIG. 1, one preferred embodiment of a data processing system will be described which concurrently sends multiple streams of data to respective I/O devices, in accordance with the present invention. This data processing system is comprised of several components which are identified and described below.

Component 10 is an instruction processor which, in one actual embodiment, is a 2200 instruction processor from Unisys Corporation. Alternatively, any other instruction processor can be used, such as an x86 from Intel Corporation.

Component 11 is a memory which is coupled to the instruction processor 10 via a memory bus 11a, and this memory 11 stores various computer programs (not shown) that are executed by the instruction processor 10. In these computer programs, the WRITE-TO-DISK instruction 12 is most relevant to the present invention; and one WRITE-TO-DISK instruction 12 is shown in the FIG. 1 memory 11.

Each of the components 13-1, 13-2 ... 13-N is a block of data words in the memory 11; and each data word in any one block is represented in FIG. 1 by a horizontal line DW. Here, a single data word can be any predetermined number of bits, such as thirty-six bits for example. All of the data words in all of the blocks 13-1 thru 13-N together constitute a data stream that is to be written to one particular disk when the WRITE-TO-DISK instruction 12 is executed.

Component 14 is a list of pointers P which define the data stream by linking together the different blocks of data words 13-1 thru 13-N. The i-th pointer in the list contains the address in the memory 11 of the start of the i-th block of data words. Also, the i-th pointer includes a count of the number of words in the i-th block. This list 14 is identified in the WRITE-TO-DISK instruction 12 by a reference R.

For the sake of simplicity, only one WRITE-TO-DISK instruction 12 is shown in FIG. 1 along with its data stream 13-1 thru 13-N and its list of pointers 14. However, in an actual system, all of the components 12, 13-1 thru 13-N, and 14 are typically replicated hundreds of times in the memory 11.

Component 20 is an I/O processor which is directed by the instruction processor 10 to execute multiple WRITE-TO-DISK instructions. Included within the I/O processor 20 are several other components 21, 22 ... 27-M which are shown in FIG. 1. All of those components interact to execute each WRITE-TO-DISK instruction 12.

Component 21 is a controller which is coupled to the memory 11 via a memory bus 11b, and which is also coupled to a bridge 26-1 via a PCI bus 25-1. This controller 21 is partitioned into two major sections 22 and 23 which perform different functions.

Component 22 is the supervisor section of the controller 21. In operation, the supervisor section 22 determines when to start the execution of each WRITE-TO-DISK instruction 12; and it determines when to end the execution of each WRITE-TO-DISK instruction.

Component 23 is the data transfer section of the controller 21. In operation, the data transfer section 23 uses the memory bus 11b to read sliding segments of multiple data streams from the memory 11; and concurrently, it uses the PCI bus 25-1 to send a subsegment of each sliding segment to the particular disks on which the data streams are to be written.

Component 24i is a novel refetchable first-in-first-out memory (hereinafter referred to as the RFIFO 24i) which is replicated several times inside the data transfer section 23 of the controller 21. In one actual embodiment, the RFIFO 24i is replicated one-hundred-twenty-eight times. Each RFIFO 24i tracks and stores a sliding segment of one particular data stream 13-1 thru 13-N, as well as a subsegment of the sliding segment, in a novel fashion which is herein described in detail in conjunction with FIGS. 3A–3D.

Each of the components 25-1, 25-2, and 25-3 is a PCI bus. All of the signal lines in each PCI bus are defined by industry standards.

Each of the components 26-1 and 26-2 is a bridge. Bridge 26-1 is coupled between the PCI buses 25-1 and 25-2, while bridge 26-2 is coupled between the PCI buses 25-2 and 25-3. Each bridge 26-1 and 26-2 includes a data buffer 26a which temporarily holds a portion of a data stream as it passes thru the bridge. To expand the FIG. 1 system, more bridges and host bus adapters can be added as desired.

Each of the components 27-1 thru 27-N is a host bus adapter which couples one PCI bus to a respective set of disks on a respective SCSI channel. For example, the host bus adapter 27-1 couples the PCI bus 25-2 to a set of disks 31-1 on the SCSI channel 30-1.

Each of the components 30-1 thru 30-M is a SCSI channel; and each of the components 31-1 thru 31-M is a set of disks on a SCSI channel. All of the signal lines in each SCSI channel are defined by industry standards.

Figure 2A:
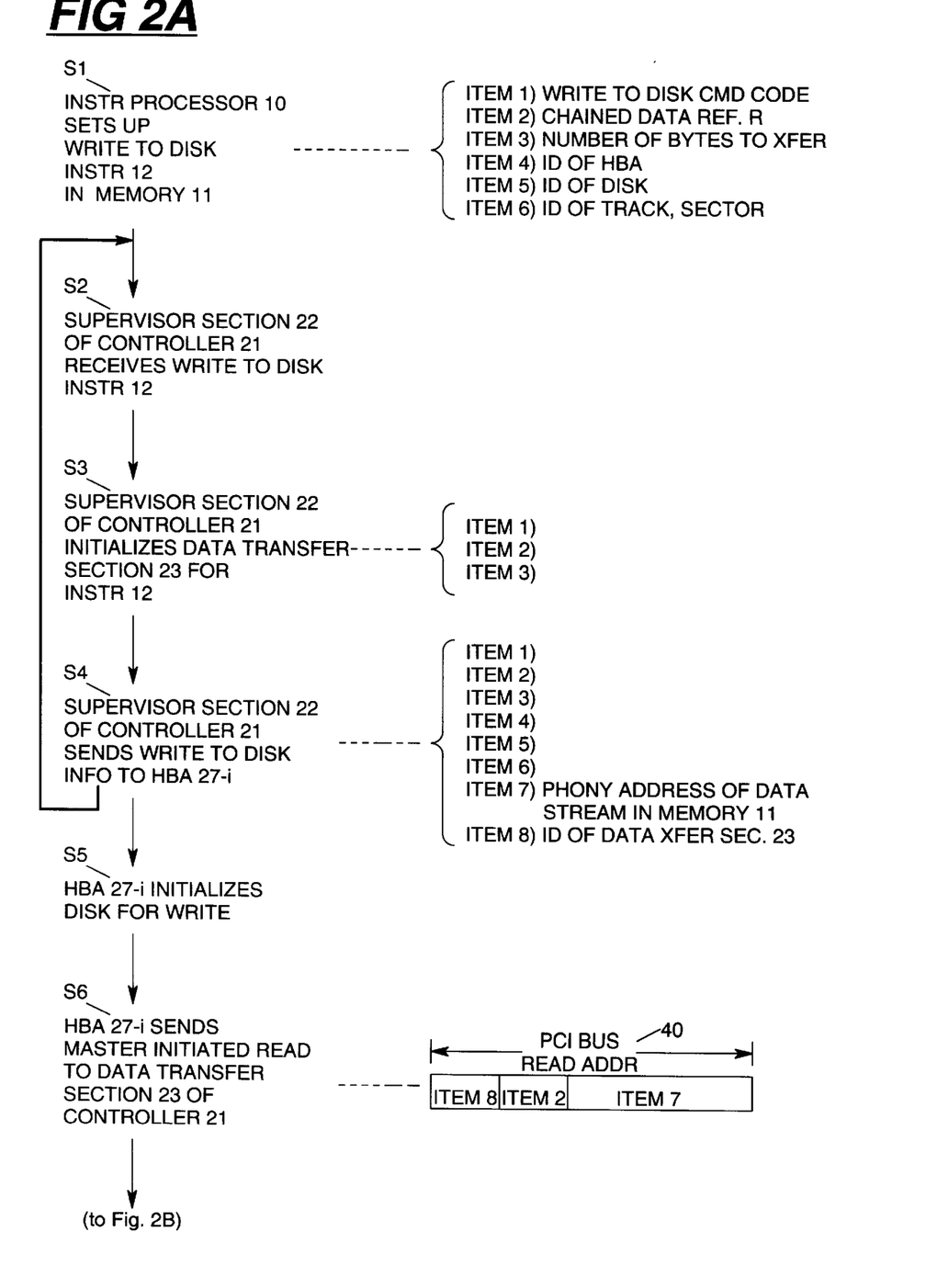
FIGS. 2A and 2B are flow charts which together show various steps which the FIG. 1 system performs in order to concurrently send multiple streams of data to respective I/O devices, in accordance with the present invention.
Figure 2B:
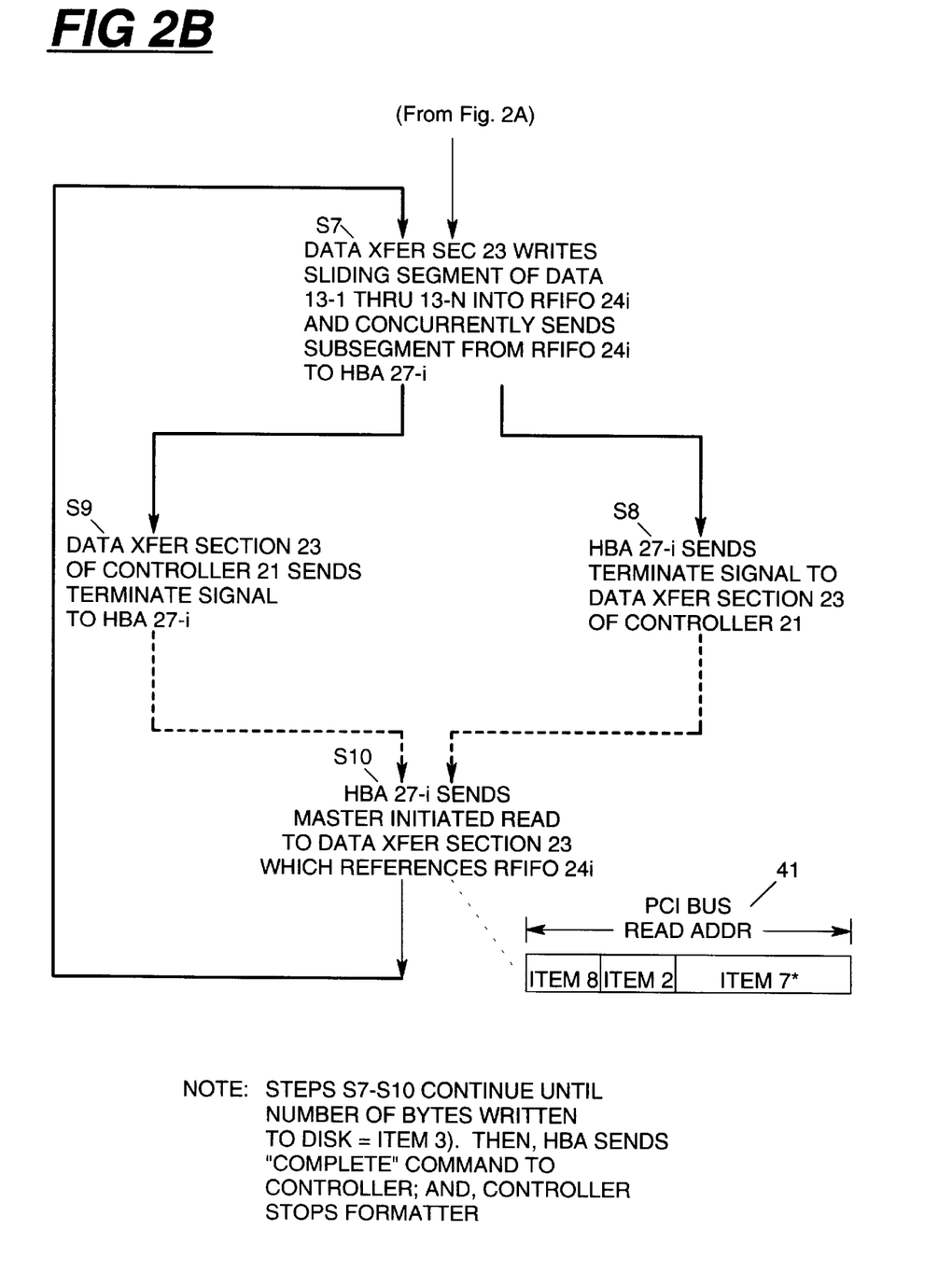

How all of the above-described components of the FIG. 1 system interact to concurrently execute multiple WRITE-TO-DISK instructions 12 is illustrated by the flow charts of FIGS. 2A and 2B. Initially, in step S1, the instruction processor 10 sets up one WRITE-TO-DISK instruction 12 in memory 11. During that setup, six different items are entered into the WRITE-TO-DISK instruction 12; and those items are listed in FIGS. 2A to the right of step S1.

Item 1 is a command code for the WRITE-TO-DISK instruction. Item 2 is the reference R to one particular list 14 which defines one particular data stream 13-1 thru 13-N. Item 3 is the total number of bytes to write onto the disk from the data stream 13-1 thru 13-N. Item 4 is an identifier of the particular host bus adapter 27i that is coupled to the disk on which the data is to be written. Item 5 is an identifier of the particular disk on which the data is to be written. Item 6 is an identifier of a track and sector in the disk where the write is to begin.

After the WRITE-TO-DISK instruction 12 is set up in the memory 11, step S2 is performed wherein the supervisor section 22 of the controller 21 receives the WRITE-TO-DISK instruction. To perform step S2, the supervisor section 22 periodically reads a predetermined portion of the memory 12 where the WRITE-TO-DISK instructions 12 are set up by the instruction processor 11.

In response to the receipt of a WRITE-TO-DISK instruction 12, the supervisor section 22 of the controller 21 performs step S3 wherein the data transfer section 23 is initialized. During this step, items 1–3 from step S1 are transferred from the supervisor section 22 of the controller 21 to the data transfer section 23. Then the data transfer section 23 assigns one particular RFIFO 24i to the data stream which is identified by reference R in item 2.

Next, in step S4, the supervisor section 22 of the controller 21 sends certain information to the particular host bus adapter 27-i that is identified by item 4. This information consists of item 1 thru item 6 as described above, plus an item 7 and an item 8.

Item 7 is a phony starting address in the memory 11 of the data stream 13-1 thru 13-N. In the preferred embodiment, this phony starting address, is always address zero. Item 8 is the identity on the PCI bus 25-1 of the data transfer section 23 of controller 21. These items 1–8 are listed to the right of step S4.

Steps S2–S4 are repeated by the supervisor section 22 of the controller 21 in a cyclic fashion. By that action, the supervisor section 22 can cause the data transfer section 23 of the controller 21, and several host bus adapters 27-1 thru 27-M, to concurrently execute several WRITE-TO-DISK instructions.

Each time step S4 is performed, one host bus adapter 27-i responds by performing step S5 wherein the disk on which the data is to be written is initialized. This initializing includes selecting the proper track on the disk, for example.

After step S5 is complete, the host bus adapter 27-i performs step S6 wherein it sends a MASTER INITIATED READ command on the PCI bus 25-2 to the data transfer section 23 of the controller 21. This MASTER INITIATED READ command includes a PCI BUS READ ADDRESS 40 in which item 8, item 2, and item 7 are concatenated together as is shown to the right of step S6.

In response to the MASTER INITIATED READ command of step S6, the data transfer section 23 of the controller 21 performs S7. There, the data transfer section 23 writes a sliding segment of one data stream 13-1 thru 13-N into one RFIFO 24i; and concurrently, the data transfer section 23 sends a subsegment of the sliding segment from the RFIFO 24i through the bridge 26-1 to the host bus adapter 27-i. The particular data stream and particular RFIFO 24i which are used in step S7 are determined by the reference R in item 2 of the PCI BUS READ ADDRESS 40.

In step S7, the subsegment of data that is sent to the host bus adapter 27-i is sent as a transmission burst on the PCI busses 25-1 and 25-2. During this transmission burst, successive bytes of data are sent without waiting for the receipt of a separate acknowledgment signal for each data byte that is received by the host bus adapter 27-i. This burst mode of transmission greatly increases the transmission rate in comparison to a non-burst mode in which the receipt of one data byte is acknowledged before the next byte is sent. The burst transmission of step S7 continues until step S8 and/or step S9 is performed.

In step S8, the host bus adapter 27-i sends a TERMINATE signal on the PCI bus 25-2 to the data transfer section 23 of the controller 21. This TERMINATE signal can be sent at any time during the performance of step S7. In response to the TERMINATE signal of step S8, the data transfer section stops writing the sliding segment of data into the RFIFO 24i, and it stops sending a subsegment of the sliding segment from the RFIFO 24i to the host bus adapter 27-i.

When the host bus adapter 27-i sends the terminate signal in step S8, all of the bytes that are sent in step S7 from the data transfer section 23 of the controller 21 will not actually be received by the host bus adapter 27-1. Instead, some of the bytes which are sent from the data transfer section 23 of the controller 21 will still be in the buffer 26a of the bridge 26-1. Those bytes in the buffer 26a will be discarded by the bridge 26-1 in response to the terminate signal.

In step S9, the data transfer section 23 of the controller 21 sends a TERMINATE signal on the PCI bus 25-1 to the host bus adapter 27-i. This TERMINATE signal can be sent at any time during step S7. When step S9 is performed, the data transfer section 23 stops writing the sliding segment of data into the RFIFO 24i, and it stops sending a subsegment of the sliding segment from the RFIFO 24i to the host bus adapter 27-i.

After the sending of the TERMINATE signal in step S8 and/or step S9, the PCI buses 25-1 thru 25-3 can be used for any purpose, such as writing other data streams to other disks. Then, at some later time, the WRITE-TO-DISK instruction which uses the particular RFIFO 24i to write the particular data stream 13-1 thru 13-N, can be restarted.

To do that, the host bus adapter 27-i sends another MASTER INITIATED READ command which references the data stream 13-1 thru 13-N. This occurs in step S10 of FIG. 2B wherein the MASTER INITIATED READ command includes a PCI BUS READ ADDRESS 41. There, item 8 and item 2 are concatenated together along with a modified item 7, which is shown in FIG. 2B as item 7\*.

Item 2 is the reference to the one particular data stream 13-1 thru 13-N that was already partially stored in the one particular RFIFO 24i and was partially sent to the host bus adapter 27-i. Item 7\* is an update of the phony starting address in the memory 11 of the data stream 13-1 thru 13-N.

To generate the updated phony address in item 7\*, the host bus adapter 27-i increases by one the phony starting address of item 7 each time it actually receives a byte of the subsegment of the data stream 13-1 thru 13-N that is sent in step S7. Thus, the phony address in item 7\* is equivalent to a count of the number of bytes in the data stream 13-1 thru 13-N which have actually passed thru the buffer 26a and have been received by the host bus adapter 27-i.

Next, in response to MASTER INITIATED READ command of step S10, the data transfer section 23 of the controller 21 performs step S7. There the data transfer section 23 of the controller 21 uses item 7\* to determine the location in the RFIFO 24i of the data byte that was last received by the host bus adapter 27-i. After that determination is made, the data transfer section 23 of the controller 21 continues to write additional portions of the sliding segment of data stream 13-1 thru 13-N into the RFIFO 24i; and concurrently, it continues to send a subsegment of the sliding segment from the RFIFO 24i through the bridge 26-1 to the host bus adapter 27-i. Step S7 is performed until a TERMINATE signal is sent by step S8 and/or step S9.

All of the steps S7-S10 are repeated until the total number of bytes that are written onto the disk equals item 3. Then, the host bus adapter 27-i sends a completion command to the supervisor section 22 of the controller 21; and in response, the supervisor section 22 sends signals to the data transfer section 23 which indicate that the WRITE-TO-DISK instruction is complete.

During the above-described process for executing the WRITE-TO-DISK instructions, each RFIFO 24i tracks and stores a sliding segment of one data stream 13-1 thru 13-N, as well as a subsegment of the sliding segment, in a novel fashion. How that occurs will now be described in detail in conjunction with FIGS. 3A–3D.

In FIGS. 3A–3D, one particular RFIFO 24i is shown at various times during the execution of the WRITE-TO-DISK instruction 12. That one RFIFO 24i in FIGS. 3A–3D passes the one particular data stream 13-1 thru 13-N which is referenced when the reference R in item 2 has a value of R=R1. Also in FIGS. 3A–3D, the RFIFO 24i has a total storage capacity of 1,000 data bytes; and individual data bytes are stored starting at an RFIFO address of 000 and ending at an RFIFO address of 999.

Figure 3A:
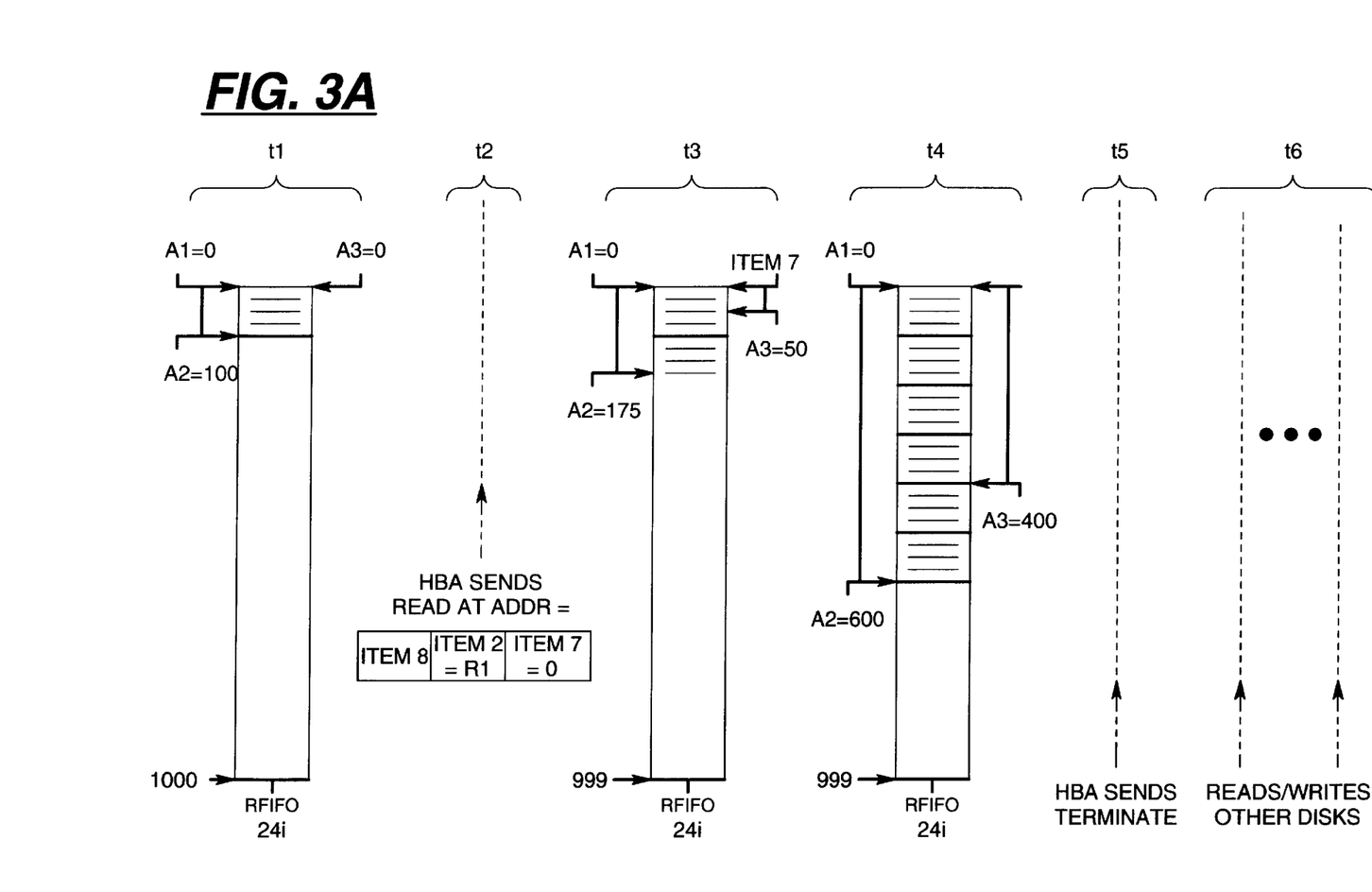
FIGS. 3A–3D show how certain steps in the flow chart of FIGS. 2A–2B are performed, in accordance with the present invention, by a refetchable first-in-first-out memory within the FIG. 1 system.

Initially, at time t1 in FIG. 3A, the data transfer section 23 of the controller 21 starts to write the sliding segment of the data stream 13-1 thru 13-N into the RFIFO 24i beginning at the RFIFO address of A1=0 and ending at the RFIFO address of A2=100. This writing occurs in response to the data transfer section 23 being initialized in step S3 of FIG. 2A.

To read the sliding segment of the particular data stream 13-1 thru 13-N from the memory 11, the data transfer section 23 of the controller 21 uses the reference R1 which it received as item 2 in step S3. This sliding segment is read in words from the memory 11 and written in bytes in the RFIFO 24$i$.

Subsequently, at time t2 in FIG. 3A, the host bus adapter 27-$i$ sends the MASTER INITIATED READ command to the data transfer section 23 of the controller 21. This corresponds to step S6 of FIG. 2A. That MASTER INITIATED READ command includes the PCI BUS READ ADDRESS 40 of step S6 which is a concatenation of item 8, item 2, and item 7.

Item 2=R1 selects the particular RFIFO 24$i$ that is shown in FIGS. 3A–3D. Item 7 is the phony address in the memory 11 of the data stream 13-1 thru 13-N; and it is equivalent to the count of the number of bytes in that data stream which have been received by the host bus adapter 27-$i$. Initially, item 7 is zero.

In response to the MASTER INITIATED READ command at time t2, the data transfer section 23 increases the sliding segment of the data stream 13-1 thru 13-N in the RFIFO 24$i$. Concurrently, the data transfer section 23 reads a subsegment of the sliding segment from the RFIFO 24$i$ and sends it through the bridge 26-1 to the host bus adapter 27-$i$. This subsegment is sent via a transmission burst in which the receipt of individual bytes in the subsegment are not acknowledged by the host bus adapter 27-$i$.

The above writing and reading is illustrated in FIG. 3A at times t3–t4, and it corresponds to step S7 of FIG. 2B. At time t3, the number of bytes in the sliding segment in the RFIFO 24$i$ is shown as having increased from 100 to 175. Also, at time t3, the number of bytes in the subsegment of the sliding segment which has been read from the RFIFO 24$i$ and sent thru the bridge 26-1 to the host bus adapter 27-$i$ is shown as 50. Address A3 is the address in the RFIFO 24$i$ of the particular byte in the subsegment which is currently being read from the RFIFO 24$i$ and sent to the host bus adapter 27-$i$.

Similarly, a time t4, the number of bytes in the sliding segment within the RFIFO 24$i$ is shown as having increased to 600. Also at time t4, the number of bytes in the subsegment of the sliding segment which has been read from the RFIFO 24$i$ and sent to the host bus adapter 27-$i$ is shown as 400.

Thereafter, at time t5 in FIG. 3A, the host bus adapter 27$i$ sends a terminate signal to the data transfer section 23 of the controller 21. This corresponds to step S8 in FIG. 2B.

In response to the above terminate signal, the bridge 26-1 discards any data bytes which have been sent from the data transfer section 23 of the controller 21 that are still in the buffer 26$a$ of the bridge. Consequently, when the host bus adapter 27-$i$ sends the terminate signal, the data transfer section 23 of the controller 21 is unable to determine the exact number of data bytes that were actually received by the host bus adapter 27-$i$.

After the terminate signal occurs at time t5, the PCI busses 25-1 thru 25-3 can be used to read data streams from other disks, and to write data streams to other disks. This occurs at time t6 in FIG. 3A.

Subsequently, at time t7 in FIG. 3B, the WRITE-TO-DISK instruction which was being executed at times t3–t4 is restarted. To do that, the host bus adapter 27$i$ sends another MASTER INITIATED READ command with a PCI BUS READ ADDRESS in which item 2 equals R1. That causes the data transfer section 23 of the controller 21 to select the particular data stream 13-1 thru 13-N that was being transferred at times t3–t4.

Also, the PCI READ ADDRESS which is sent at time t7 includes item 7* which is an update of the address of zero that was sent at time t2. To generate the updated address in item 7*, the host bus adapter 27-$i$ increases by one the address of zero each time it actually receives a byte of the data stream 13-1 thru 13-N during times t3–t4. This updated address in item 7* is shown at time t7 of FIG. 3 as being equal to 300 as an example.

In response to the PCI READ ADDRESS at time t7, the data transfer section 23 of the controller 21 uses the updated address in item 7* to delete a portion of the sliding segment of the data stream 13-1 thru 13-N which is currently in the RFIFO 24$i$. How this deletion occurs is shown in FIG. 3B at times t8 and t9.

At time t8, address A1 equals 0; and it points to the start of the sliding segment which was previously written in the RFIFO 24$i$. Also at time t8, the updated address in item 7* equals 300. Consequently, all of the data bytes in the RFIFO 24$i$ which lie between address 0 and address 300 can be deleted.

To perform the deletion, data words are not actually removed from the RFIFO 24$i$. Instead, the address A1 which points to the start of the sliding segment is simply changed from 0 to 300. This is shown at time t9.

Also at time t9, the address A3 is backed up from 400 to 300. This is done so that the address A3 points to the particular byte in the sliding segment which needs to be read next from the RFIFO 24$i$ and sent to the host bus adapter 27$i$. All of the data bytes from address 300 to address 400 were previously sent to the host bus adapter 27-$i$ at times t3–t4; and they will be sent again due to the above back-up of the address A3.

After time t9, the data transfer section 23 increases the sliding segment of the data stream 13-1 thru 13-N which it writes into the RFIFO 24$i$. Concurrently, the data transfer section 23 reads a subsegment of the sliding segment from the RFIFO 24$i$ and sends it through the bridge 26-1 to the host bus adapter 27-$i$. Here again, the subsegment is sent via a transmission burst in which the receipt of individual bytes are not acknowledged by the host bus adapter 27-$i$.

Figure 3B:
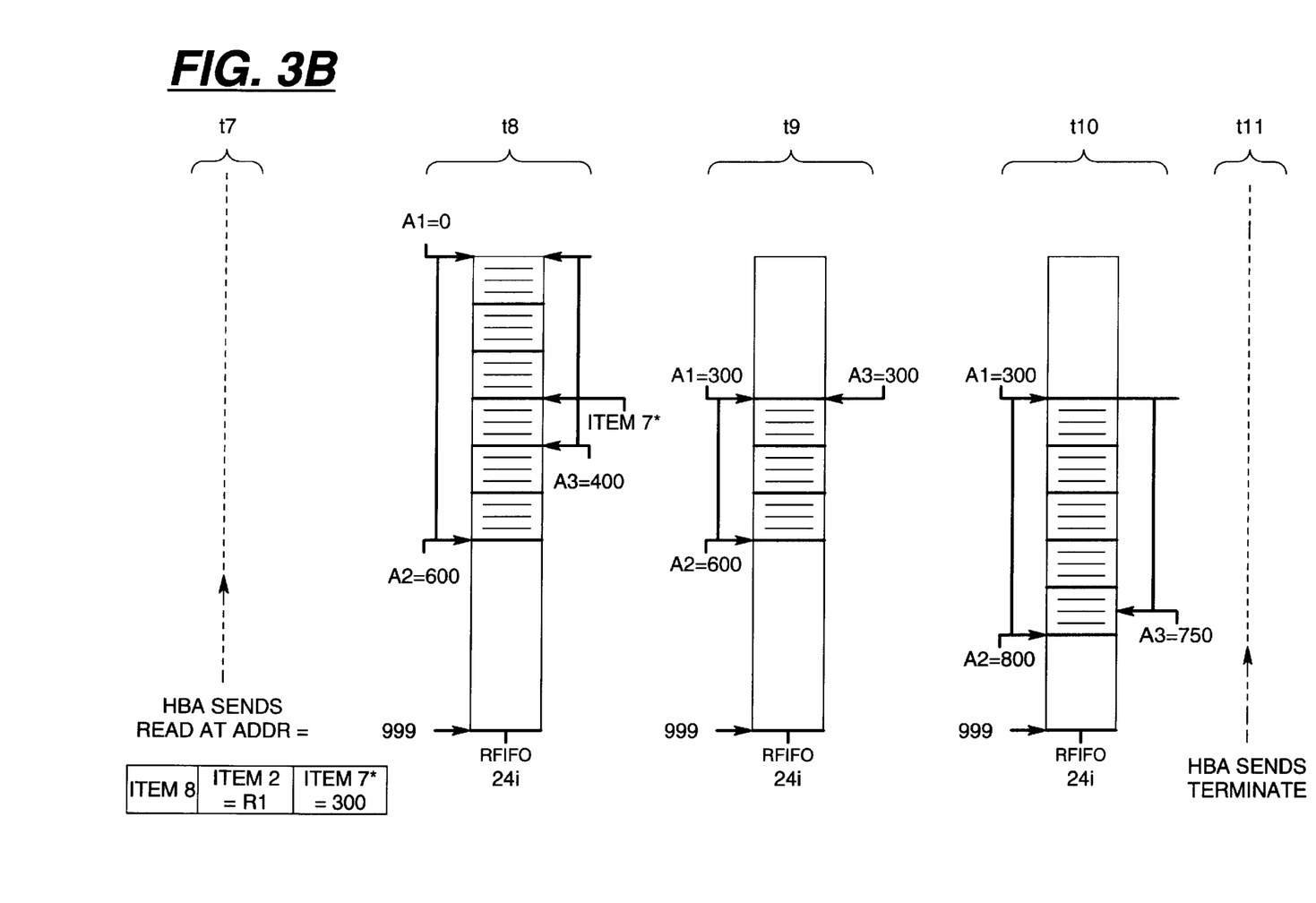

The above writing and reading is illustrated in FIG. 3B at time t10; and it corresponds to step S7 of FIG. 2B. At time t10, the sliding segment which is stored within the RFIFO 24$i$ is shown as starting at the RFIFO address of 300 and ending at the RFIFO address of 800. Also at time t10, the subsegment of the sliding segment which has been read from RFIFO 24$i$ and sent through the bridge 26-1 to the host bus adapter 27-$i$ is shown as starting at the RFIFO address of 300 and ending at the RFIFO address of 750.

Thereafter, at time t11 in FIG. 3B, the host bus adapter 27-$i$ sends a terminate signal to the data transfer section 23 of the controller 21. This corresponds to step S8 in FIG. 2B.

In response to the above terminate signal, the bridge 26-1 discards any data bytes which have been sent from the data transfer section 23 of the controller 21 that are still in the buffer 26$a$ of the bridge. Then, the PCI busses 25-1 thru 25-3 can be used to read data streams from other disks, and to write data streams to other disks; and this is shown as occurring in FIG. 3C at time t12.

Subsequently, at time t13 in FIG. 3C, the WRITE-TO-DISK instruction which was being executed at times t3–t4 and times t8–t10 is re-started. To do that, the host bus adapter 27$i$ sends another MASTER INITIATED READ command with a PCI BUS READ ADDRESS in which item 2 is set equal to R1. Also, the PCI BUS READ ADDRESS which is sent at time t13 includes item 7* which has been updated by the host bus adapter 27-$i$ to a value of 700.

In response to the PCI BUS READ ADDRESS at time t13, the data transfer section 23 of the controller 21 uses the updated address in item 7* to delete a portion of the sliding segment of the data stream 13-1 thru 13-N which is currently in the RFIFO 24$i$. This deletion occurs in FIG. 3C at times t14 and t15. At time t14, the address A1 equals 300, and the updated address in item 7* equals 700. Consequently, all of the data bytes in the RFIFO 24$i$ which lie between address 300 and address 700 can be deleted.

To perform the above deletion, the address Al is simply changed from 300 to 700. This is shown at time t15. Also at time t15, the address A3 is backed-up from 750 to 700. This is done so that the address A3 points to the particular byte in the sliding segment which will be read next from the RFIFO 24$i$ and sent the to the host bus adapter 27-$i$. Due to this back-up, all of the data bytes which are in the RFIFO 24$i$ from address 700 to address 750 will be resent to the host bus adapter 27-$i$.

Following time t15, the data transfer section 23 increases the sliding segment of the data stream 13-1 thru 13-N which it writes into the RFIFO 24$i$. Concurrently, the data transfer section 23 reads a subsegment of the sliding segment from the RFIFO 24$i$ and sends it via a transmission burst through the bridge 26-1 to the host bus adapter 27-$i$. This writing and reading is illustrated in FIG. 3C at time t16; and it corresponds to step S7 in FIG. 2B.

At time t16, the sliding segment which is stored in the RFIFO 24$i$ is shown as starting at the RFIFO address of 700 and ending at an RFIFO address of 200. Thus, at time t16, the sliding segment in the RFIFO 24$i$ wraps from the last storage location AT ADDRESS 999 to the first storage location. Also at time t16, the subsegment of the sliding segment which has been read from the RFIFO 24 is shown as starting at the RFIFO address of 700 and ending at the RFIFO address of 125. Thus, at time t16, this subsegment wraps from the last storage location in the RFIFO 24$i$ to the first storage location.

Figure 3C:
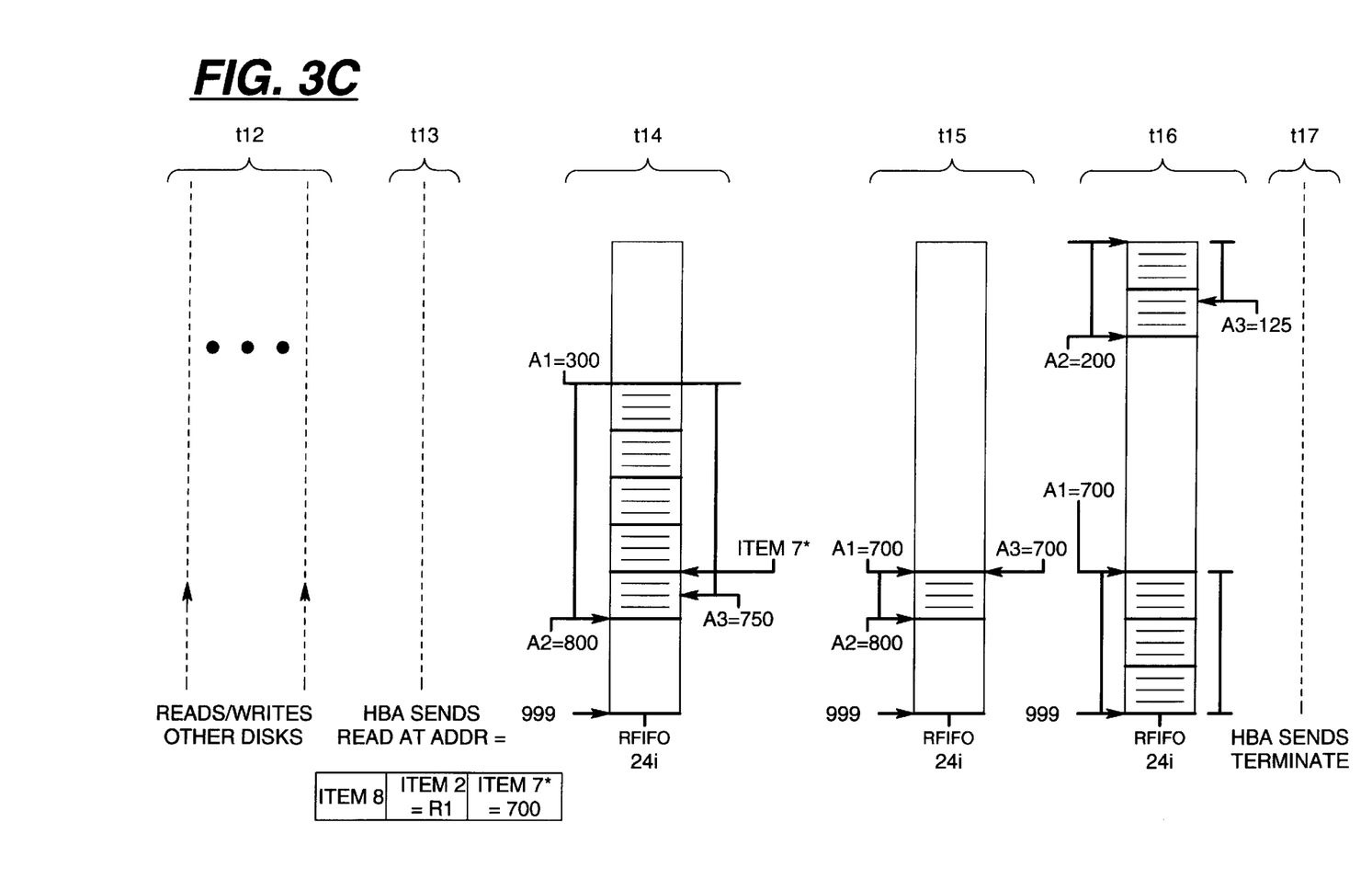

Thereafter, at time t17 in FIG. 3C, the host bus adapter 27-$i$ sends a terminate signal to the data transfer section 23 of the controller 21. In response, the bridge 26-1 discards any data bytes which have been sent from the data transfer section 23 of the controller 21 that are still in the buffer 26$a$ of the bridge.

Following the above terminate signal, the PCI Busses 25-1 thru 25-3 can be used to read data streams from other disks, and to write data streams to other disks. This is shown as occurring in FIG. 3D at time t18.

Figure 3D:
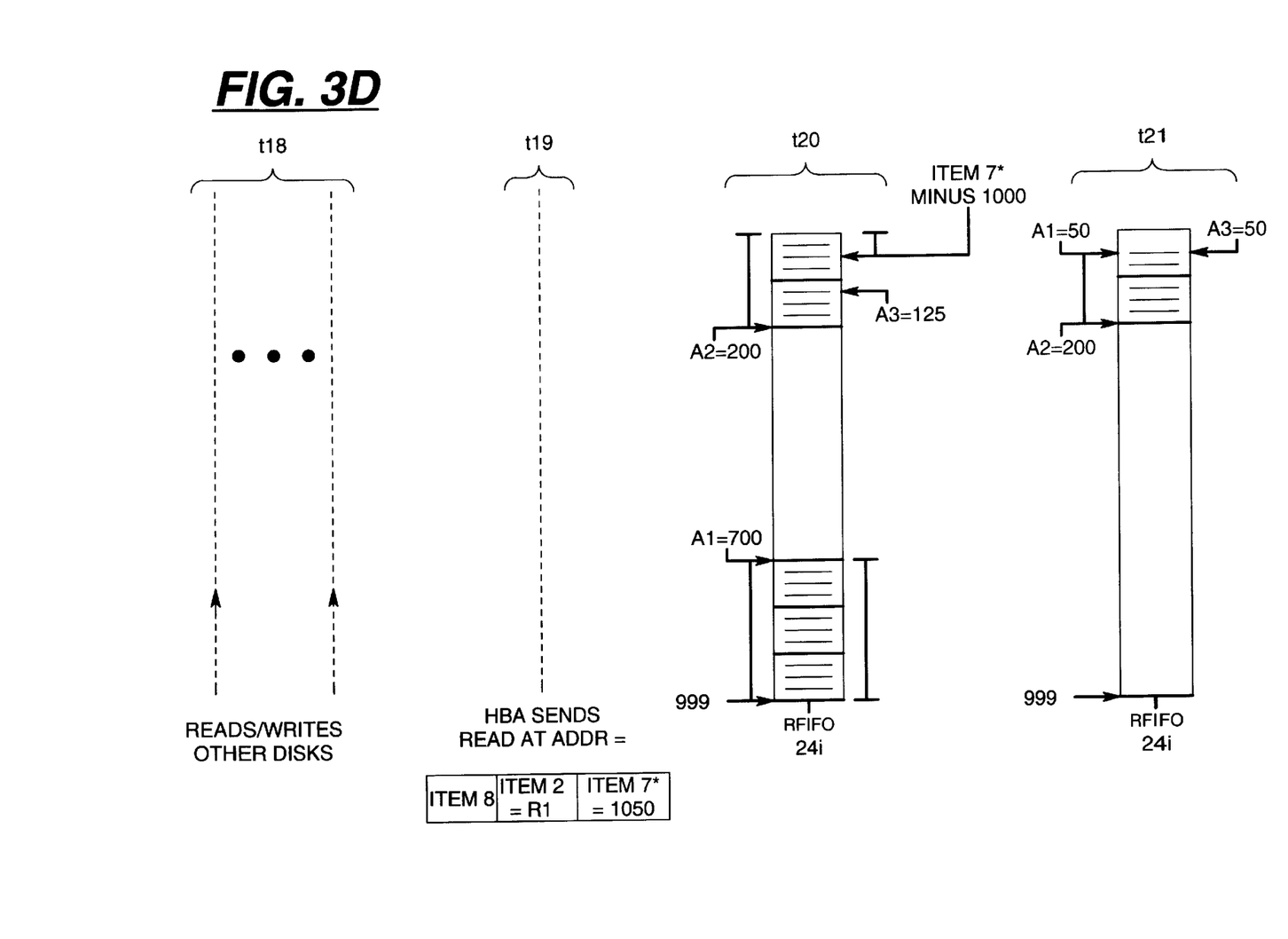

Next, at time t19 in FIG. 3D, the WRITE-TO-DISK instruction which was being execution at times t3–t4, t8–t10, and t14–16 is re-started. To do that, the host bus adapter 27-$i$ sends another MASTER INITIATED READ command with a PCI BUS READ ADDRESS in which item 2 is set equal to R1. Also, the PCI READ ADDRESS that is sent at time t19 includes item 7* which is shown in FIG. 3D as having a value of 1050.

In response to the PCI READ ADDRESS at time t19, the data transfer section 23 of the controller 21 deletes a portion of the sliding segment of the data stream 13-1 thru 13-N which is currently in the RFIFO 24$i$. This is done is shown in FIG. 3D at times t20 and t21.

At time t20, the sliding segment starts at address 700 in the RFIFO 24$i$, and the updated address in item 7* equals 1050. This updated address in item 7* indicates that a total of 1050 data bytes have been received by the host bus adapter 27-$i$. However, the total storage capacity of the RFIFO 24$i$ is only 1000 data bytes. Thus, the address of the last data byte in the RFIFO 24$i$ which has actually been received by the host bus adapter 27-$i$ is determined by subtracting 1000 from item 7*.

At time t21, all of the data bytes which are stored in the RFIFO 24$i$ from address 700 to the address of 1050 minus 1000 are deleted. To do that, the address A1 is simply changed from 700 to 50. Also at time t21, the address A3 is backed-up from 125 to 50. Address A3 points to the data byte that will be read next from the RFIFO 24$i$ and sent to the host bus adapter 27-$i$. Thus, due to the back-up of the address A3, all of the data bytes from address 50 to address 125 will be sent to the host bus adapter 27-$i$ for a second time.

After time t21, the operations which are described above continue in a similar fashion until the total number of bytes that are written onto the disk equals item 3. Then, the host bus adapter 27-$i$ sends a completion command to the supervisor section 22 of the controller 21; and in response, the supervisor section 22 sends signals to the data transfer section 23 which indicate that the WRITE-TO-DISK instruction is complete. Thereafter, the data transfer section 23 can use the RFIFO 24$i$ to perform another WRITE-TO-DISK instruction.

One preferred embodiment of a data processing system, which operates in accordance with the present invention, has now been described in detail. In addition, however, various modifications can be made to the details of the above system and the details of its operation without departing from the nature and spirit of the invention.

For example, as a modification to the abovedescribed sequence at times t11–t15 in FIGS. 3B and 3C, suppose that the terminate signal at time t11 is sent by the data transfer section 23 of the controller 21, rather than by the host bus adapter 27-$i$. This corresponds to step S9 in FIG. 2B. Such a terminate signal can be sent for any reason. For example, if the RFIFO address A3 has caught up to the RFIFO address of A2=800 at time t10, then the data transfer section 23 of the controller 21 will send the terminate signal at time t11 because the RFIFO 24$i$ has no more data to send.

When the data transfer section 23 of the controller 21 sends the terminate signal, all the data which is in the preceding subsegment will pass thru the data buffer 26$a$ in the bridge 26-$i$ and be received by the host bus adapter 27-$i$. This will be reflected by item 7* in the PCI BUS READ ADDRESS which is sent at time t13. Thus, if the RFIFO address A2 and A3 both equal 800 at time t11 when the terminate signal is sent, then item 7* will equal 800 in the PCI BUS READ ADDRESS at time t13.

As another modification, consider the structure of the RFIFO 24$i$ that is shown in FIGS. 3A–3D. There, the storage cells of the RFIFO 24$i$ are read and written in bytes, and the total storage capacity of the RFIFO 24$i$ is 1000 bytes. But as an alternative, the storage cells of the RFIFO 24$i$ can be read and written in words of any predetermined number of bits. Also, as an alternative, the RFIFO 24$i$ can have any predetermined storage capacity.

Likewise, the bus 25-1 of FIG. 1 which intercouples the controller 21 to the bridge 26-1, and the bus 25-2 which intercouples the bridge 26-1 to host bus adapters 27-$i$ thru 27-M, can have any number of data lines to carry the subsegments of the data stream from the RFIFO 24$i$. Further, the buses 25-1 and 25-2 are not limited to being PCI buses;

but instead, they can be any bus on which the terminate signals and read addresses 40 and 41 of FIGS. 2A–2B can be sent.

Also, as another modification, the buffer 26a which is shown in FIG. 1 is not limited to being inside of the bridges 26-1 and 26-2. Instead, the buffer 26a can be any external buffer which is coupled between the RFIFO 24i and the disks 31-1 thru 31-M. For example, the buffer 26a can be in an input module for the host bus adapter 27-i; or the buffer 26a can be in an output module for the controller 21.

Further, as another modification, the supervisor section 22 and the data transfer section 23 of the controller 21 can have any internal structure to perform their respective steps of FIGS. 2A–2B. For example, each section 22 and 23 can be comprised of a general purpose microprocessor chip and a computer program. As another example, each section 22 and 23 can be comprised of a special purpose sequential state machine.

Accordingly, it is to be understood that the invention is not limited to just the illustrated preferred embodiment, but is defined by the appended claims.

What is claimed is:

1. A method of sending a stream of data from a memory thru a controller to an I/O device which is coupled to said controller thru a data buffer; said method including the steps of:

transferring a segment of said stream of data from said memory into said controller while concurrently sending a subsegment of said segment from said controller thru said data buffer to said I/O device via a transmission burst in which the receipt of individual parts of said subsegment are not acknowledged by said I/O device;

receiving a signal in said controller, from said I/O device at any time during said sending step, to terminate said transmission burst;

subsequently receiving a signal in said controller, from said I/O device, to restart said transmission burst beginning with a selectable part of said subsegment;

removing from said controller, only the portion of said segment which precedes said selectable part of said subsegment; and, repeating the above steps until said stream of data is received in its entirety by said I/O device.

2. A method according to claim 1 wherein said controller includes a refetchable first-in-first-out memory (RFIFO) and, a) writes said segment into said RFIFO in a first cyclic sequence, and b) reads said subsegment from said RFIFO in a second sequence which is the same as said first sequence except that the second sequence backs-up in response to said signal to restart said transmission burst beginning with a selectable part of said subsegment.

3. A method according to claim 2 wherein said controller maintains a first address which points to the beginning of said segment in said RFIFO, maintains a second address which points to the end of said segment in said RFIFO, and performs said removing step by changing said first address in response to said signal to restart such that said first address points to the part of said subsegment which was selected by said signal to restart.

4. A method according to claim 3 wherein during said sending step, said controller maintains a third address which identifies the part of said segment which is currently being sent in said subsegment.

5. A method according to claim 1 wherein said stream of data is stored in said memory as a data chain which includes multiple data blocks with each data block starting in said memory at a different address.

6. A method according to claim 1 wherein said stream of data words is stored in said memory as a single data block.

7. A method according to claim 1 wherein said data buffer is in a bridge which is intercoupled between said controller and said I/O device, and said sending step sends each subsegment thru said bridge.

8. A method according to claim 1 wherein said data buffer is in an I/O bus adapter for said I/O device which is intercoupled between said controller and said I/O device, and said sending step sends each subsegment thru said I/O bus adapter.

9. A method according to claim 1 wherein said data buffer is in an output module for said controller which is intercoupled between said controller and said I/O device, and said sending step sends each subsegment thru said I/O output module.

10. A method according to claim 1 wherein each subsegment from said controller is sent on a PCI bus to said I/O device.

11. A method according to claim 1 wherein said controller stops said transmission burst, on its own, by sending a signal to terminate to said I/O device.

* * * * *